March 2, 1926.
W. H. FRAZINE ET AL
1,575,424
PEACH GRADER
Filed Sept. 2, 1924
3 Sheets-Sheet 1
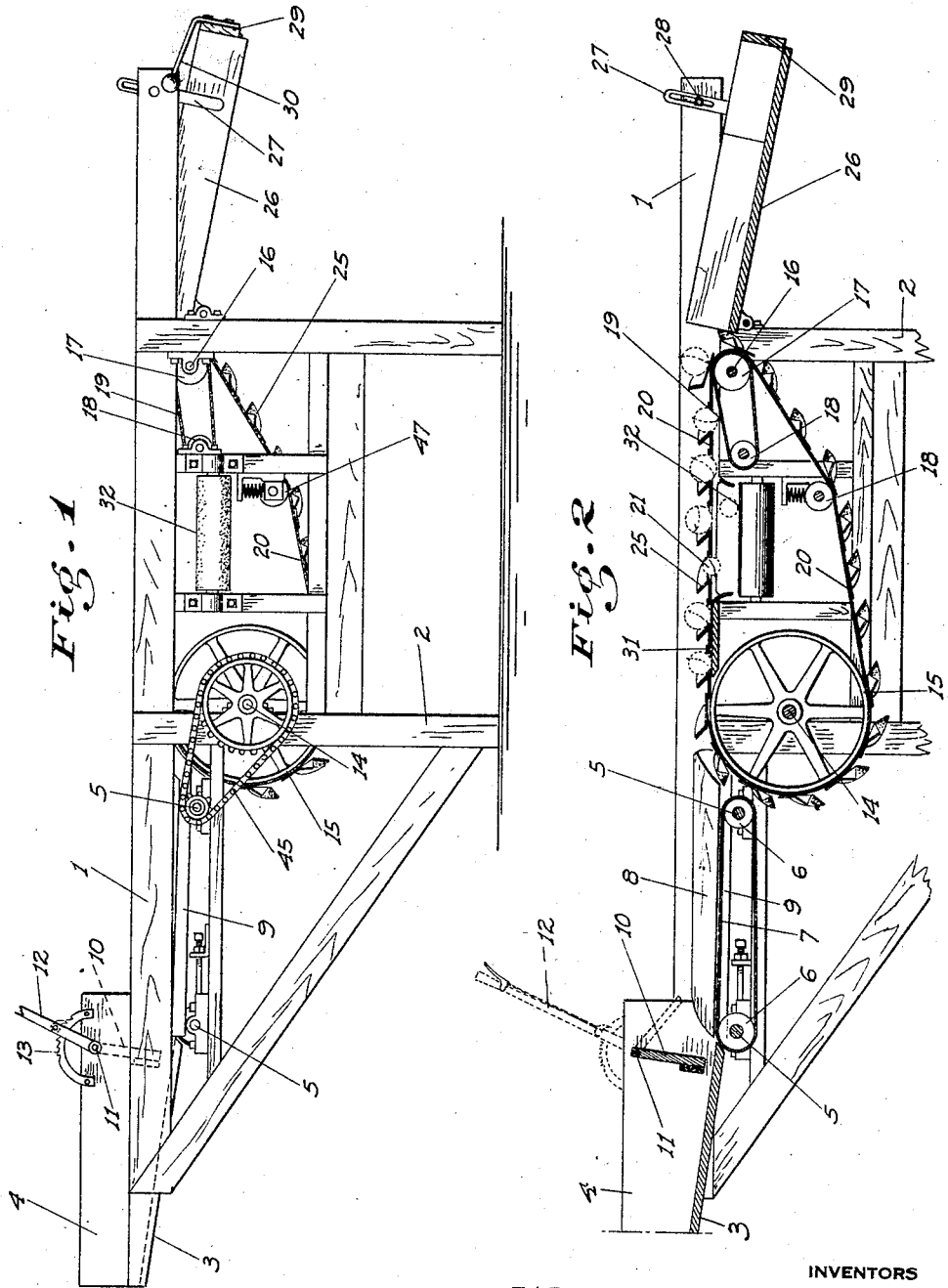
INVENTORS
Wm H. Frazine and
Chas W. Morrill
BY
ATTORNEY

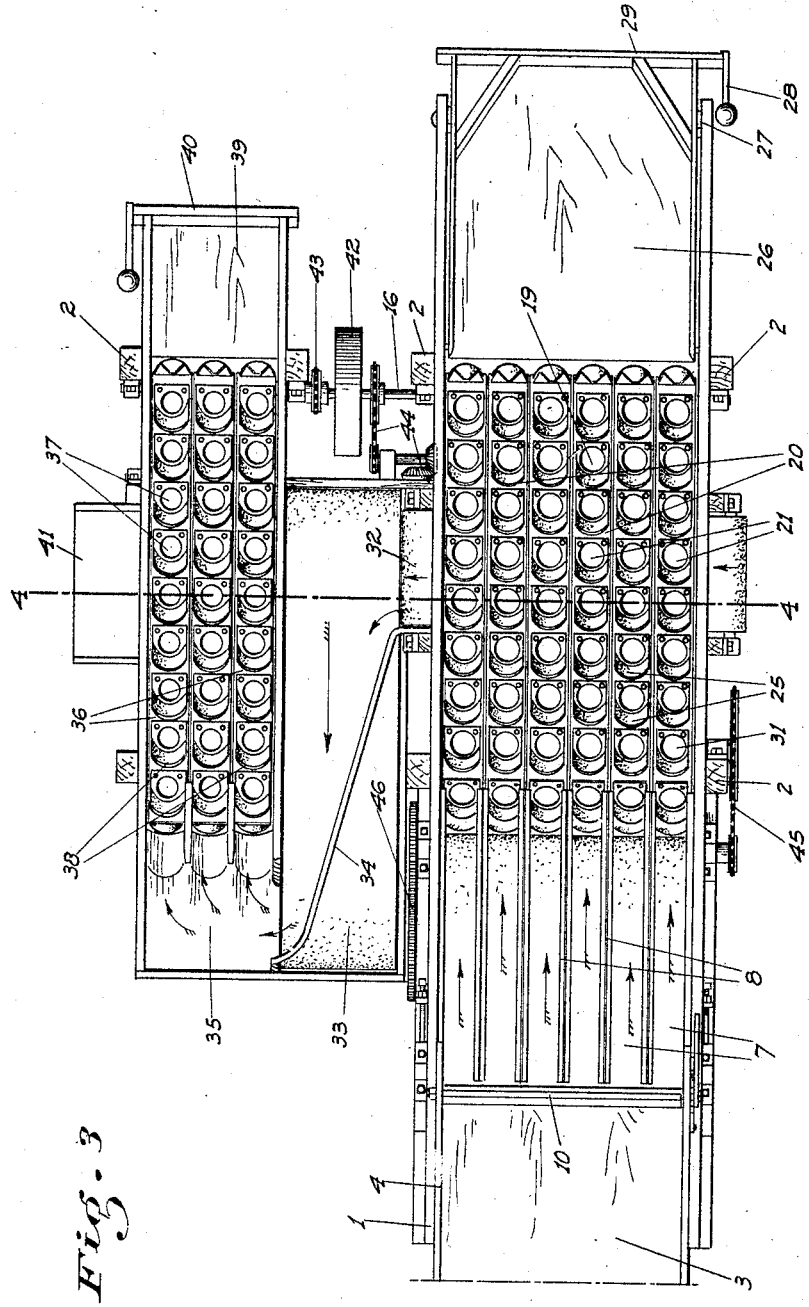

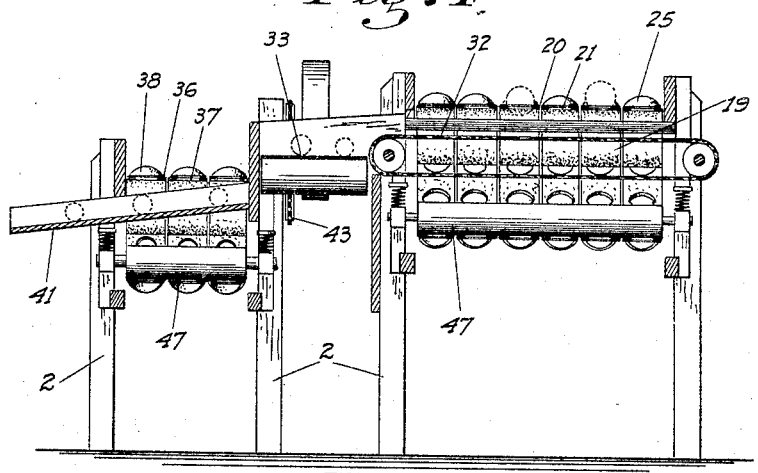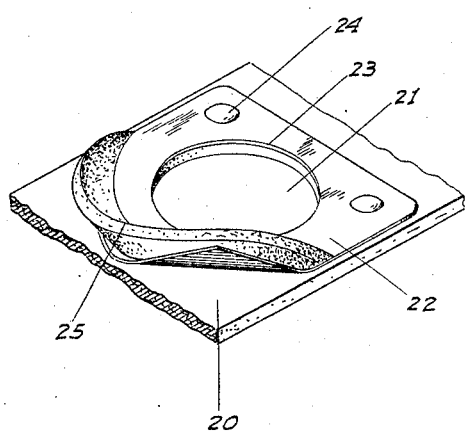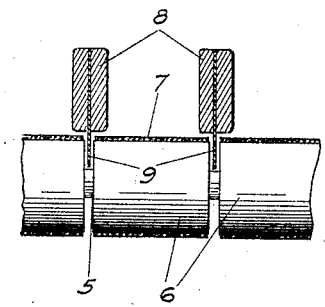

Patented Mar. 2, 1926.

1,575,424

UNITED STATES PATENT OFFICE.

WILLIAM H. FRAZINE AND CHARLES W. MORRILL, OF MODESTO, CALIFORNIA.

PEACH GRADER.

Application filed September 2, 1924. Serial No. 735,243.

*To all whom it may concern:*

Be it known that we, WILLIAM H. FRAZINE and CHARLES W. MORRILL, citizens of the United States, residing at Modesto, county of Stanislaus, State of California, have invented certain new and useful Improvements in Peach Graders; and we do declare the following to be a full, clear and exact description of the same, reference being had to the accompanying drawings, and to the characters of reference marked thereon, which form a part of this application.

This invention relates to improvements in machines for grading fruit, especially peaches, though any fruit of similar shape may be graded with equal efficiency.

The principal object of our invention is to provide a machine for the purpose by means of which ungraded fruit placed thereon at one end will be automatically carried toward the other end of the machine, and during said travel the fruit will be automatically segregated into the different grades or sizes desired, without any handling on the part of the operator being necessary.

Another object is to arrange that the fruit, during its automatic handling by the machine, will not be subjected to any rough treatment of a nature which would cause it to be bruised or otherwise damaged—a feature inherent in most grading machines, and which lessens of course the market value of the fruit. This is especially true in the case of peaches, which are of tender texture.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Fig. 1 is a side elevation of the machine.

Fig. 2 is a longitudinal section of the same.

Fig. 3 is a top plan view thereof.

Fig. 4 is a transverse section on line 4—4 of Fig. 3.

Fig. 5 is a detached perspective view of a grading cup.

Fig. 6 is a fragmentary cross section of the feed-belt and fruit guide structure.

Referring now more particularly to the characters of reference on the drawings, the numeral 1 denotes a transversely spaced and longitudinally extending pair of rails supported a suitable distance from the ground by a suitable framework 2.

Between the rails at the forward end thereof is a table 3 having a slight downward and rearward slope and provided with sides 4.

Journaled on the frames 2 are shafts 5, disposed rearwardly of the table 3 in longitudinally spaced relation to each other. On each shaft is fixed a plurality of transversely spaced rollers 6 having individual belts 7 passing thereover. The upper faces of these belts are about on a level with the table and are arranged to travel away from the same.

Extending lengthwise of the belts and parallel thereto are vertical partitions 8 forming runways from the rear end of the table to the rear ends of the belts.

The space between each partition is sufficient to receive the largest size of fruit but insufficient to take two fruit at the same time in transversely alined order. The partitions preferably overhang the faces of adjacent belts near their edges, and have thin centrally disposed webs or flanges 9 extending between the belts and pulleys, as shown in Fig. 6. This construction prevents the belts, which are somewhat loosely mounted on their pulleys, from crowding over onto one another, while a plurality of belts, rather than a single wide one, is used for reasons of expediency in manufacture. Theoretically however, a single belt could be used.

A swing-gate 10, mounted on a transverse shaft 11 journaled near the top of the members 4, is disposed just ahead of the partitions. Movement of this gate is controlled by a lever 12 with which is associated a suitable form of pawl and rachet structure 13 so that the gate may be maintained in any desired position. This gate opens to the rear, so as not to exert a push on any fruit on the table.

A suitable distance beyond the feed belts is a transverse shaft 14 on which is mounted a drum 15. Rearwardly of the shaft 14 is another shaft 16 on which is fixed a pulley 17, said shafts 14 and 16 being so disposed that the upper faces of the drum and pulley are in horizontal alinement. Forwardly of the pulley 17 is another pulley 18, belts 19 passing over said pulleys, the upper faces of said belts having a downward slant in a forward direction over the drum and over the belts 19 on the pulley 17, pass belts 20 longitudinally alined with the belts 8, and arranged to travel in the same direction as said belts 7. Each belt 20 is provided throughout its length with a single row of longitudinally spaced round orifices 21 of a size to pass any fruit therethrough but the largest sizes. Superimposed on the belt about each orifice is a rigid plate 22, having an orifice 23 of the same size as and normally coinciding with the orifice 21 (see Fig. 5). These plates are fastened only at their rear ends to the belt as by means of rivets 24. Mounted on the plates around the forwardly extending portions of the orifices therein are cups formed of upwardly projecting and forwardly angled and crescent shaped strips 25 of resilient or cushioning material such as rubber.

The spacing between the rear ends of the feed belts 7 and the adjacent ends of the belts 20 is just sufficient to enable the cups to pass freely therebetween, and the angularity of the cups with respect to the axis of the drum is such that when a cup is moving up and is adjacent the level of the upper faces of the feed belts, it is then in a substantially horizontal plane, as shown in Fig. 2.

Beyond the rear ends of the belts 20 is a table 26 onto which all fruit remaining on the belts passes as soon as the latter turn downwardly about the pulley 17. This table is preferably hinged at its forward end onto the frames 2, and is arranged to be set at different slopes, as may be desired, by suitable means such as by slotted links 27 attached to the table and extending up adjacent the rails 1, bolts 28 in the latter passing through the slots in the links and clamping the latter against the rails. A rearwardly opening gate 29 is hinged across the rear end of the table, its opening being controlled by a suitable handle 30.

Directly under the belts 20 extending from the drum 15 a certain distance to the rear, is a solid plate or board 31. Beyond said board is a transverse driven draper 32, whose upper face is a sufficient distance below the belts 20 to allow any fruit dropping through the orifice 21 onto said draper, to be carried under and clear of the belts without interference therewith.

This draper discharges onto another draper 33 disposed at right angles to the draper 32, or parallel to the belts 20 and to one side of the latter. Over and adjacent the upper face of draper 33 extends a diagonal deflector 34 arranged to discharge the fruit travelling on said draper onto a chute or runway 35 disposed alongside the draper and leading to grading belts 36 extending parallel to the main grading belts 20. The belts have holes 37 therethrough of a smaller size than the holes 21 but similarly disposed. Surrounding the holes 37 are cups 38 of similar design to the cups 25.

In fact the belt structure 36 is a duplicate of the main grading apparatus on a smaller scale. The belts 36 at their rear ends discharge onto a slanting table 39 provided at its rear end with a gate 40 similar to the gate 29. Intermediate the ends of the belts 36 a transverse discharge chute or runway 41 is mounted thereunder, to carry off any fruit dropping through the holes 37.

As far as the operation of the apparatus is concerned, the draper 33 could be omitted, and the belts 36 arranged to receive fruit directly from the draper 32. This would either necessitate placing the belts 36 at right angles to the main belts, or if the parallel arrangement of the belts were maintained, the belts 36 would extend considerably beyond the belts 20. Therefore for the sake of compactness the two grading units are arranged in parallel relation and as shown.

The belt units 20 and 36 therefore travel in the same direction, the cross draper 32 travels toward the draper 33 which is disposed between the grading units, while the draper 33 travels in the opposite direction to the grading belts.

Various arrangements may be employed to drive the various belts and drapers. We have here shown power as being initially applied to the shaft 16 from a pulley 42, and from said shaft to the corresponding shaft of the units 36 by a chain or similar connection 43. Likewise from said shaft 16 power is applied to the draper 32 by a combination drive illustrated at 44.

The rear feed-belt shaft 5 is connected in driving relation with the shaft 14 by a chain or similar drive 45 in such a manner that the feed belts will travel somewhat slower than the grading belts. Said shaft 5 is also connected in driving relation with the adjacent shaft of the draper 33 by means of gears 46 which cause the draper to travel in a direction opposite to that of the feed belts 7.

To maintain the belts 20 and 36 under proper tension, spring-pressed or similar tightener pulleys 47 are provided to bear against the inner faces of the belts at suitable points.

In operation, the belts and drapers are set in motion and the peaches to be graded dumped onto the head table 3. From here they will roll onto the belts 6 between the partitions 8, which as before stated are so spaced as only to allow the peaches to pass in single file. The belts carry the peaches to the belts 20, and as each cup thereon moves upwardly toward the level of the feed belts, a peach overhanging the gap between the belts 6 and 20 will be picked up by the cup and moved along with the corresponding belt 20, the next peach in line on the corresponding belt 6 being picked up by the next cup and so on continuously. It will be understood that all peaches, regardless of size, are deposited one by one in the cups and carried along with the belt until the latter passes over the draper 32, to which the orifices in the belt permit access of any fruit in said cups of a lesser diameter than the orifices, which will then of course drop through onto said draper. The fruit incapable of passing through the orifices will remain on the belts until with the movement of the latter around the rear pulley 16, the fruit is discharged onto the table 26. This fruit is the largest or No. 1 grade, and from the table may be emptied into suitable boxes upon opening the end gate 29. Some of the fruit in the cups while passing over the draper 32 may tend to stick in the orifices without actually dropping therethrough. In such cases the sloping belt 19 below, will gradually and gently force the peaches upwardly and out of said orifices as the belts approach the rear end of their travel, and without imparting any shock to the peaches while so doing.

The peaches on the draper 32 are carried onto the secondary grading belts 36, where they are received in the cups 38, from which the smallest peaches drop through the holes 37 into the chute 41, while those too large to do so pass onto the rear end table 39, to be also emptied thence into boxes. The fruit in the chute 41, in the case of peaches, is considered as culls, and are of little or no value except for hog feed or third rate markets. Of course if more than two sizes are to be graded, the apparatus could be made with another belt structure onto which the chute would discharge.

The feed belts and drapers are all as soft and pliable as it is possible to practically make them, and the various table surfaces and the like are padded to minimize the possibility of bruising the fruit.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In a fruit grader, a horizontal grading belt having spaced orifices cut therethrough, plates fixed on the upper face of the belt, and having orifices normally alining with the belt orifices, and fruit retaining cups mounted on the plates.

2. In a fruit grader, a horizontal grading belt having spaced orifices cut therethrough, plates fixed on the upper face of the belt, and having orifices normally alining with the belt orifices, the plates being bent up at their forward corners at an obtuse angle, and curved cushioning strips partially surrounding the plate orifices and abutting against and secured to the bent up portions of the plates.

3. In a fruit grader, solid faced and spaced pulleys, a travelling grading belt passing thereover, said belt having spaced orifices of a predetermined size, fruit retaining cups arranged in connection with the orifices, fruit receiving means under the belt intermediate and in spaced relation to the pulleys, and a solid surface closely disposed under the belt between the head pulley and the adjacent edge of the fruit receiving means, whereby to cause all fruit held in place on the belt by the cups to be maintained substantially on a level with the belt until the latter passes over the fruit receiving means thereunder.

In testimony whereof we affix our signatures.

WILLIAM H. FRAZINE.
CHARLES W. MORRILL.